United States Patent [19]

Robinson

[11] 4,036,469

[45] July 19, 1977

[54] BUTTERFLY VALVE

[75] Inventor: Daniel T. Robinson, Milwaukee, Wis.

[73] Assignee: Milwaukee Valve Company, Inc., Milwaukee, Wis.

[21] Appl. No.: 575,934

[22] Filed: May 9, 1975

[51] Int. Cl.² .............................................. F16K 1/22
[52] U.S. Cl. ..................................... 251/306; 251/315; 251/208
[58] Field of Search ......... 251/305, 306, 315, DIG. 1, 251/205, 208; 137/625.31

[56] References Cited

U.S. PATENT DOCUMENTS

| | | | |
|---|---|---|---|
| 2,547,116 | 4/1951 | Gould | 251/DIG. 1 |
| 2,882,010 | 4/1959 | Bryant | 251/306 |
| 2,980,392 | 4/1961 | Greenwood | 251/205 |
| 3,095,177 | 6/1963 | Muller | 251/306 |
| 3,234,966 | 2/1966 | Klose | 251/306 |
| 3,487,435 | 12/1969 | Sheardown | 251/205 |
| 3,565,394 | 2/1971 | Smith | 251/306 |

Primary Examiner—William R. Cline
Assistant Examiner—H. Jay Spiegel
Attorney, Agent, or Firm—Michael, Best & Friedrich

[57] ABSTRACT

The butterfly valve includes a body having a cylindrical bore, a continuous internal groove in the bore and a resilient O-type, sealing ring mounted in the groove. Rotatably mounted in the bore for shutting off flow is a valve member which preferably is disc-shaped and includes a peripheral seating surface of spherical shape for sealingly engaging the sealing ring when the valve is in a closed position. The valve member also includes a plurality of circumferentially spaced retainers, such as a plurality of axially extending fins located on the opposite sides of the disc and having a curvilinear outer face, which slidably engage normally unrestrained sections of the sealing ring and mechanically retain these sections against dislodgment from the groove during valve operation, particularly by the differential fluid forces existing across the valve member during initial opening and final closing.

4 Claims, 6 Drawing Figures

BUTTERFLY VALVE

BACKGROUND OF THE INVENTION

This invention relates to butterfly valves and more particularly to butterfly valves adaptable for use in high pressure systems.

Butterfly valves typically include a circular valve member or disc which is rotatably mounted inside a valve body having a generally cylindrical bore defining a flow passage. O-rings formed from a soft seating material have been used to provide a fluid tight seal when the disc is in a closed position. The O-ring either is mounted in a peripheral groove on the disc and engages a seating surface in the valve body bore or is mounted in an annular groove provided in the valve body bore and is engaged by the outer periphery of the disc. Such O-rings are quite acceptable for valves used in low pressure systems but can cause operational problems for valves used in high pressure systems.

Immediately after sealing engagement of the O-ring is broken during initial opening of the valve or immediately prior to establishing sealing engagement during final closing of the valve, a high pressure differential exists across the disc at the constricted opening between the disc and the valve bore. This differential pressure produces fluid forces which tend to cause the O-ring to be dislodged from or "blown out" of its mounting groove and/or pinched between the disc and the valve bore. Prior attempts have been made to alleviate this problem; however, these attempts have not been completely successful, either because the "blow out" problem has not been completely eliminated or the added structural complexities resulted in a substantial increase in the overall costs of the valve.

Examples of prior art arrangements for retaining O-rings are disclosed in U.S. Pats. Nos. 3,234,966 (Klose) and 2,282,010 (Bryant). In the construction disclosed by the Klose patent, a curvilinear portion including a plurality of circumferentially spaced, longitudinally extending grooves is provided in the valve body bore. Such a construction requires relatively complex and expensive fabrication techniques. In the construction disclosed by the Bryant patent, a relatively complex retainer is used to mechanically retain the O-ring in its groove and the disc is provided with a plurality of circumferentially spaced grooves which serve as flow passages during initial opening or final closing of the valve. These grooves tend to decrease the time for equalizing the differential pressure across the valve during initial opening or final closing; however, they may not always provide rapid enough pressure equalization to prevent the O-ring from becoming at least partially dislodged from its groove, particularly when the valve is used in higher pressure systems and/or the disc is quickly opened or closed.

SUMMARY OF THE INVENTION

A primary object of the invention is to provide a butterfly valve including an O-type sealing member and having a simple, effective means for positively retaining the sealing member in its mounting groove during valve operation.

Another object of the invention is to provide a butterfly valve which includes an O-type sealing member and can be used in relatively high pressure systems with minimum sealing ring dislodgment and/or wear and without unduly increasing the pressure drop or adversely affecting fluid flow characteristics therethrough.

Other objects, aspects and advantages of the invention become apparent upon reviewing the following detailed description, the drawing and the claims.

The butterfly valve provided by the invention includes a body having a cylindrical bore defining a flow passage through the body, a continuous internal groove in the bore for receiving a resilient sealing member and a generally circular valve member supported inside the bore for rotation between an open position and a closed position to shut off flow. The valve member includes peripheral seating surfaces of spherical shape which sealingly engage portions of the sealing member when the valve member is in a closed position and retainer means for slidably engaging the sealing member at circumferentially spaced locations immediately after sealing contact between the seating surfaces of the valve member and the sealing member is broken during valve opening or immediately prior to establishment of this sealing contact during valve closing. This retainer means is arranged to mechanically hold the sealing member in its mounting groove against dislodgment by the differential fluid forces existing across the valve member at initial opening or final closing.

In one embodiment the valve member is disc shaped and includes a plurality of circumferentially spaced, axially extending ribs or fins, each having a curvilinear outer surface which slidably engages the sealing member during a predetermined portion of the rotational travel of the disc. In this embodiment, these ribs or fins preferably are provided only along one half of the disc circumference on the upstream side and along the opposite half of the disc circumference on the downstream side.

In another embodiment, the valve member generally is in the form of a fluted or slotted ball or sphere having a central, generally planar portion having an outer spherical surface which sealingly engages the sealing member when the valve is closed. The slots serve as flow passages when the valve is open and the outer surfaces of the unslotted portions slidably engage the sealing members throughout non-closed positions of the valve member.

DESCRIPTION OF THE PREFERRED EMBODIMENTS

Figure 4:
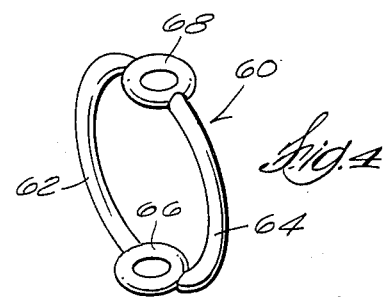
FIG. 4 is a perspective view, in reduced scale, of the sealing ring incorporated in the valve shown in FIG. 1

Illustrated in FIGS. 1-4 is a butterfly valve 10 particularly adapted for use in high fluid pressure systems and including a body 12 having a cylindrical bore 14 which defines a flow passage extending straight through body 12. The opposite ends of valve body 12 can be flanged or otherwise formed in a conventional manner for connection with associated piping.

A generally circular valve member or disc 16 is rotatably mounted within the valve bore 14 for shutting off flow. Located on disc 16 are a pair of diametrically opposed, enlarged hubs 18 and 20 which are aligned with respective coaxial, circular openings 22 and 24 provided in valve body 12. Disc hub 18 has a cylindrical recess 26 for rotatably receiving the inner end portion of a cylindrical shaft or stem 28 which extends through opening 22 and is secured to valve body 12 by suitable fastening means, such as a pin 30. Disc hub 20 has recess 32 for receiving the inner end of a shaft or stem 34 which is rotatably mounted in the valve body opening 24 and has an outer end portion 36 extending radially outwardly beyond the valve body 12. Although other arrangements can be used, in the specific construction illustrated, recess 32 and the inner end portion of stem 34 have complementary cross sections (e.g., square cross sections) and stem 34 is journaled in valve body 12 by a cylindrical bearing sleeve 38 which fits tightly about stem 34 and is rotatably received within valve body opening 24. Bearing sleeve 38 can be made from any suitable low-friction bearing material, such as Teflon, glass-filled nylon and the like.

Figure 1:
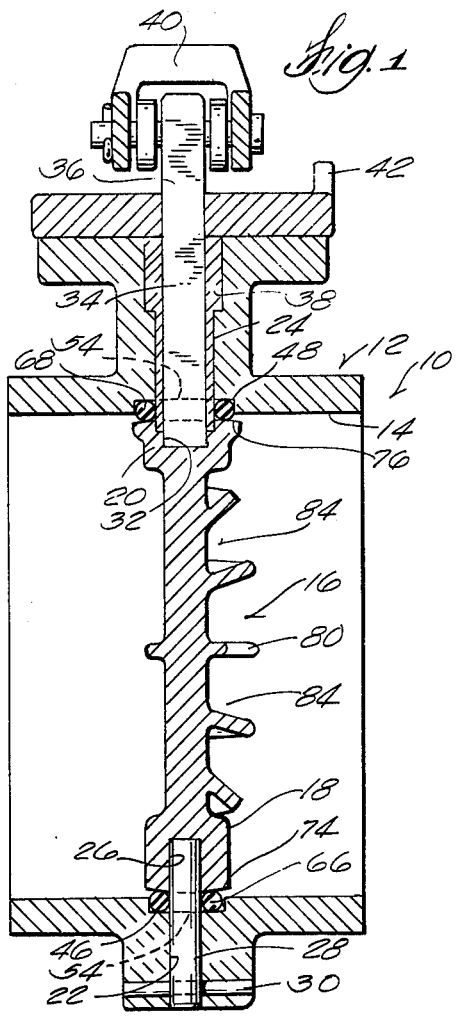
FIG. 1 is a cross sectional view of a butterfly valve embodying various of the features of the invention.
Figure 2:
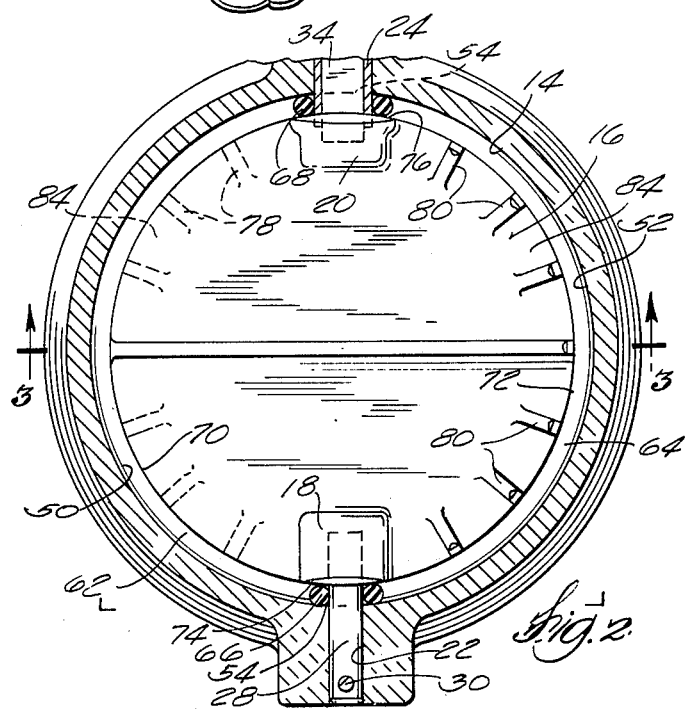
FIG. 2 is a fragmentary, top plan view, partially sectioned, of the butterfly valve shown in FIG. 1.
Figure 3:
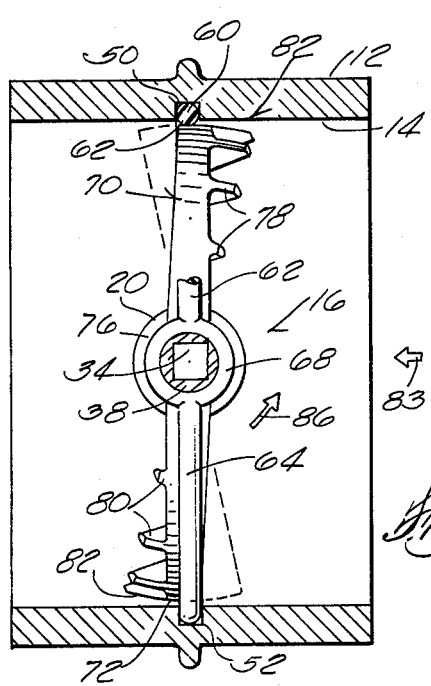
FIG. 3 is a sectional view taken along the line 3—3 in FIG. 2.

A suitable actuator means, such as a handle 40 (shown fragmentarily in FIG. 1), is attached to the outer end 36 of stem 34 for rotating disc 16, about the transverse pivot axis provided by stems 28 and 34, between a closed position where the plane of the disc is generally at a right angle to the direction of flow (as shown in FIG. 1–3) and an open position (not shown) where the plane of the disc is substantially aligned with the direction of flow, i.e., 90° from the closed position. Rotation of disc 16 is limited to 90° by suitable stop lugs 42 (one shown in FIG. 1) which restrict movement of handle 40.

Located in the valve body bore 14 is a continuous, internal recess or groove including annular or circular portions 46 and 48 encircling or surrounding respective valve body openings 22 and 24 and diametrically opposed, generally semi-circular portions 50 and 52 extending circumferentially between and connected to circular groove portions 46 and 48. As best shown in FIGS. 1 and 2, the inner or bottom wall 54 of each circular groove portion 46 and 48 is spherically shaped for purposes described below. Semicircular portions 50 and 52 of the groove preferably have a generally rectangular cross section as shown in FIG. 3.

Mounted in the groove is an O-type, unitary, resilient sealing ring 60 including semicircular sections 62 and 64 which fit into respective semicircular portions 50 and 52 of the groove and annular or circular sections 66 and 68 which are connected between semicircular sections 62 and 64 and fit into respective circular groove portions 46 and 48. Sealing ring 60 is made from a resilient material suitable for the type of service in which the valve is to be used, such as natural rubber, synthetic elastomers (e.g., BUNA-N), Fluorocarbon materials (e.g., Teflon) and the like. Sealing ring 60 preferably has a circular cross section and is dimensioned to extend radially outwardly from the groove for engagement with the peripheral seating surface of disc 16 as explained below.

Disc 16 has an external, circumferential, shperical seating surface including diametrically opposed, generally semicircular portions 70 and 72 which extend between hubs 18 and 20 and respectively sealingly engage semicircular sections 62 and 64 of sealing ring 60 when the disc is in a closed position as best shown in FIG. 3. The remaining portions of the disc seating surface comprise spherical outer faces 74 and 76 on hubs 18 and 20, respectively. Hub faces 74 and 76 are disposed in concentric, spaced relation to the spherical bottom walls 54 of circular groove portions 46 and 48 in all positions of disc 16. Thus, circular sealing ring sections 66 and 68 are at all times compressed between the spherical hub faces and the spherical bottom walls of the circular groove portions, thereby providing a fluid tight seal against leakage past stems 28 and 34 throughout all positions of disc 16.

Provided adjacent the periphery of disc 16 is a plurality of axially extending, circumferentially spaced ribs or fins 78 and 80, each having a curvilinear, spherical outer face 82 which slidably engages respective semicircular sections 62 and 64 of sealing ring 60 during a predetermined portion of the rotational travel of the disc as it initially moves away from the closed position during valve opening and as disc 16 approaches the closed position during the valve closing. As best shown in FIGS. 2 and 3, fins 78 and 80 preferably are circumferentially spaced along the periphery of respective semicircular portions 70 and 72 of disc 16 between hubs 18 and 20 on the opposite sides of the disc. For instance, when flow through the valve is in the direction of the arrow 83 in FIG. 3, fins 78 are located on the upstream side of the disc and fins 80 are on the downstream side of the disc. While the circumferential spacing between adjacent fins can be varied, in the preferred construction illustrated in FIGS. 1–4, they are spaced at equal intervals. For example, the circumferential spacing between adjacent fins can be about 20° with the fins located nearest the hubs being located about 30° from the pivot axis of disc 16.

The fins can have substantially same radial length at their base and progressively decrease in height or axial length as you move from the circumferential midpoint between the hubs toward the hubs. The height or axial length of each fin preferably is directly proportioned to the distance it is located from the axis of rotation of the disc so that all the fins remain in sliding contact with the semicircular sections of the sealing ring for the same length of time during the rotational travel of the disc. For example, the fins can be dimensioned so that they slidably engage the semicircular sections of the sealing ring for about 10°–20° of the rotational travel of the disc during initial opening or final closing. As best shown in FIG. 3, the outer faces 82 of fins 78 and 80 preferably are arcuate extensions of the spherical seating surface of disc 16. That is, the external geometry of the disc, including the seating surface and the outer faces of the fins, defines a central segment of a ball or sphere.

When the valve is in the closed position as shown in FIGS. 1–3, the spherical seating surface of disc 16 sealingly engages (i.e., slightly compresses) both the semicircular section and the circular sections of the sealing ring and fluid pressure can be applied to either side of the disc without fluid leakage. Hub faces 74 and 76 sealingly engage circular sections 66 and 68 of the sealing ring in all positions of disc 16 as described above.

As disc 16 is initially rotated from a closed position towards the open position (e.g., in the direction of the arrow 86 in FIG. 3) and sealing contact is broken between semicircular portions 70 and 72 of the disc seating surface and respective semicircular sections 62 and 64 of the sealing ring, the high differential pressure between the upstream and downstream sides of the disc normally would tend to cause the semicircular sections of the sealing ring to be dislodged from their respective groove portions. However, during a pre-determined portion of the rotational travel of the disc, the outer faces 82 of fins 78 and 80 remain in sliding, compressive engagement with the semicircular sections of the sealing ring as shown by the dashed lines in FIG. 3. Fluid flow commences through the flow passages 84 defined between the fins as soon as this sealing contact is broken and the differential pressure between the upstream and downstream sides of the disc starts to equalize. During continued rotational movement of disc 16, the fins remain in compressive contact with the semicircular sections of the sealing ring and mechanically retain them in the groove until the differential fluid forces tending to dislodge them from the groove have substantially equalized. Thus, the fins provide a positive means for mechanically retaining the sealing ring in its groove, rather than depending upon a very rapid equalization of upstream and downstream pressures as is the case with a disc including only grooves or serrations, e.g., the disc construction disclosed in the above-identified Bryant patent.

When the disc is rotated from the open position towards the closed position, outer faces 82 of fins 78 and 80 slidably engage the semicircular sections of the sealing ring before the disc reaches a position where the differential pressure across the disc reaches a level where the fluid forces would tend to dislodge the semicircular sections of the sealing ring from the groove. During continued closing movement of the disc, the fins mechanically retain the semicircular sections of the sealing ring in the groove until the seating surface of the disc sealingly engages them.

The fins can be conveniently formed as an integral part of the disc. Since the seating surface of the disc and the outer faces of the fins define a segment of a ball or sphere the outer surfaces thereof can be conveniently machined to close tolerances by conventional machine lathing techniques.

Figure 5:
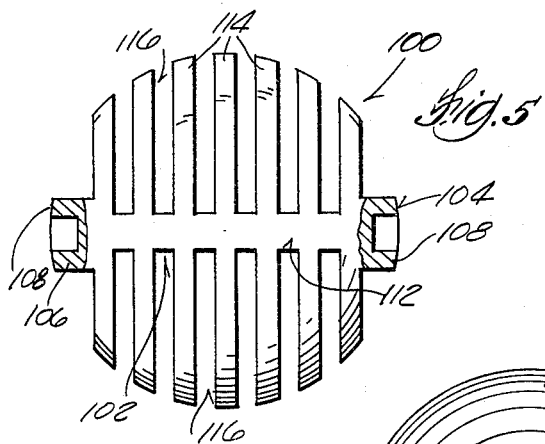
FIG. 5 is a side elevation view, partially sectioned, of an alternate construction for the disc.
Figure 6:
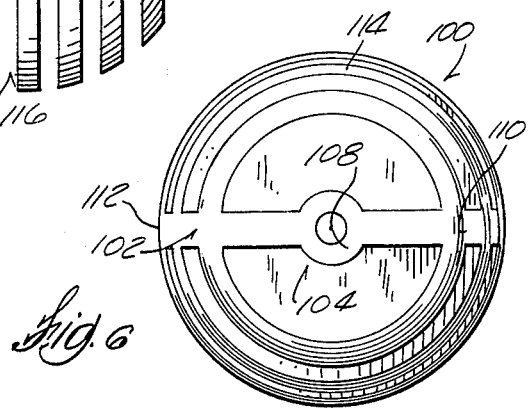
FIG. 6 is an end view of the disc shown in FIG. 5.

FIGS. 5 and 6 illustrate an alternate construction for the disc. In this alternate construction, the valve body and the sealing ring can be constructed in the same manner as illustrated in FIGS. 1-4 and disc 16 is replaced with disc 100 generally in the form of a slotted or fluted ball or sphere. Disc 100 includes a central, generally planar and circular body 102 having a spherical seating surface similar to disc 16 in FIGS. 1-4 for shutting off flow when the valve is in a closed position. More specifically, body 102 has diametrically opposed, enlarged hubs 104 and 106 including coaxial recesses for receiving respective stems. Like hubs 18 and 20 in the construction illustrated in FIGS. 1-4, the outer faces 108 of hubs 104 and 106 are spherically shaped, are disposed in concentric relation to spherical bottom walls of respective circular groove portions and compressingly engage the circular sections of the sealing ring throughout all positions of disc 100. The opposed, external circumferential surfaces 110 and 112 of body 102 extending between hubs 104 and 106, like semicircular portions 70 and 72 of disc 16 in FIGS. 1-4, are spherically shaped and sealingly engage corresponding semicircular sections of the sealing ring when disc 100 is in a closed position.

Extending from the opposite sides of body 102 are a plurality of laterally spaced vanes 114 which slidably and compressively engage the semicircular sections of the sealing ring at all times other than when the valve is in a closed position. The spacing 116 between vanes 114 serve as fluid flow passages when disc 100 is in an open position. Thus, the semicircular sections of the sealing ring are mechanically retained in the groove by the disc throughout all positions thereof during opening and closing of the valve.

What is claimed is:
1. A butterfly valve comprising
a body having a cylindrical bore defining a flow passage extending straight through said body;
a generally disc-shaped valve member including diametrically opposed, generally semicircular portions having a peripheral seating surface of spherical shape;
means supporting said valve member in said bore for rotation therein between an open position and a closed position to shut off flow through said flow passage;
a continuous internal groove in said bore including diametrically opposed, generally semicircular portions positioned to lie opposite respective of said valve member semicircular portions when said valve member is in the closed position;
a resilient sealing member disposed in said groove and including diametrically opposed, generally semicircular sections which are sealingly engaged by said valve member seating surfaces when said valve member is in the closed position;
a plurality of first and second axially extending fins respectively located on opposite sides of said valve member and respectively circumferentially spaced along the periphery of the opposite of said valve member semicircular portions, each of said fins having a curvilinear outer surface for slidably engaging respective of said sealing member semicircular sections for a predetermined portion of the rotational travel of said valve member, both after sealing contact is broken between said sealing member and said valve member seating surface during valve opening and prior to establishment of said sealing contact during valve closing, and thereby retaining said sealing member in said groove while permitting fluid flow past said valve member through passages defined between said fins during said predetermined travel, and
said fin outer surfaces together with said valve member seating surface defining the central segment of a sphere.

2. A butterfly valve according to claim 1 wherein said fins are spaced on said valve member at substantially equal intervals and each of said fins has an axial length which is directly proportional to the distance it is located from the axis of rotation of said valve member so that all of said fins are in sliding contact with respective of said sealing member semicircular sections for the same length of time during rotational travel of said valve member.

3. A butterfly valve according to claim 2 wherein
said valve body includes a pair of diametrically opposed openings extending in communication with said bore;
said valve member includes a pair of diametrically opposed hubs for receiving a stem located in and extending radially inwardly from each of said valve body openings;
said groove includes a pair of annular portions, each surrounding a respective one of said valve openings, and a pair of diametrically opposed, generally semicircular portions extending between said annular portions; and said sealing member is unitary and includes a plurality of diametrically opposed annular sections which are connected between said semicircular sections and are disposed in respective of annular groove portions and are sealingly engaged by the outer face of respective of said hubs throughout all positions of said valve member.

4. A butterfly valve according to claim 3 wherein the outer face of each of said hubs is spherically shaped;

the bottom wall of each of said annular groove portions is spherical and is concentrically disposed relative to said outer face of the respective hubs; and each of said annular sealing member sections are compressed between respective of said hub faces and said bottom walls throughout all positions of said valve member.

* * * * *